US008397591B2

(12) United States Patent
Verger

(10) Patent No.: US 8,397,591 B2
(45) Date of Patent: Mar. 19, 2013

(54) METHOD AND DEVICE FOR CONTROLLING THE QUALITY, IN PARTICULAR THE STIFFNESS AND THE PHASE, OF A HYDRO-ELASTIC JOINT

(75) Inventor: Serge Verger, La Machine (FR)

(73) Assignee: Anvis SD France S.A.S., Decize Cedex (FR)

( * ) Notice: Subject to any disclaimer, the term of this patent is extended or adjusted under 35 U.S.C. 154(b) by 255 days.

(21) Appl. No.: 12/936,704

(22) PCT Filed: Apr. 14, 2009

(86) PCT No.: PCT/EP2009/002733
§ 371 (c)(1),
(2), (4) Date: Dec. 7, 2010

(87) PCT Pub. No.: WO2009/124781
PCT Pub. Date: Oct. 15, 2009

(65) Prior Publication Data
US 2011/0107851 A1    May 12, 2011

(30) Foreign Application Priority Data

Apr. 11, 2008 (FR) ..................................... 08 52465

(51) Int. Cl.
*G01L 5/10* (2006.01)
(52) U.S. Cl. .................................... 73/862.41; 73/802
(58) Field of Classification Search ................. 73/760, 73/802, 862.41
See application file for complete search history.

(56) References Cited

U.S. PATENT DOCUMENTS

| 3,600,934 | A | * | 8/1971 | Hendrix et al. ................. 73/570 |
| 4,493,215 | A | * | 1/1985 | Gast et al. .................. 73/861.18 |
| 5,903,076 | A | * | 5/1999 | Suyama .......................... 310/81 |
| 6,933,629 | B2 | * | 8/2005 | Qiu et al. ....................... 310/34 |
| 7,660,068 | B1 | * | 2/2010 | Baumgart et al. ............... 360/75 |
| 2003/0172714 | A1 | | 9/2003 | Maeno |
| 2009/0314129 | A1 | * | 12/2009 | Crist ............................. 74/574.1 |
| 2012/0006635 | A1 | * | 1/2012 | Gade et al. ................. 188/267.2 |

OTHER PUBLICATIONS

ANVIS SD France S.A.S., International Search Report and Written Opinion for International Application No. PCT/EP2009/002733, Oct. 22, 2009, 16 pages.

* cited by examiner

*Primary Examiner* — Max Noori
(74) *Attorney, Agent, or Firm* — Matthew W. Witsil; Moore & Van Allen PLLC

(57) ABSTRACT

A process for testing the quality, in particular the stiffness and the phase, of an elastic joint for connecting two other parts while filtering vibrations transmitted between these two other parts, said elastic joint being meant to work in axial, radial or torsional direction, disposing or not disposing of one or more hydro-elastic chambers and of two cylindrical concentric support elements, the inner support element being located to a large extend inside the volume defined by the outer support element, the two support elements being connected by a set of components made of rubber or elastomer or, if applicable, of plastic and metallic parts, wherein said support elements are themselves respectively attached to the two other parts which the elastic joint connects, wherein a technique of testing by impact is applied within the timing of the production line of the elastic joint, i.e. less than 10 seconds per cycle, for identifying good joints from bad ones through a frequential analysis of the oscillation of the impacted area of the elastic joint, characterized in that the values of the phase shift of the frequential analysis are compared with a bandwidth of permissible phase shift.

32 Claims, 9 Drawing Sheets

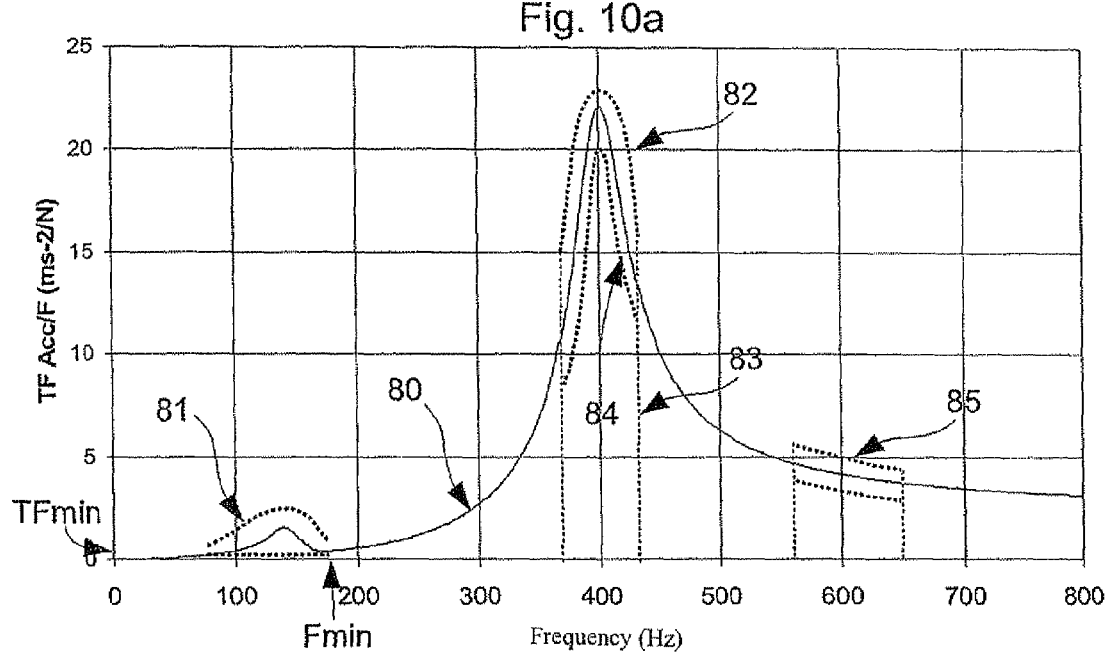
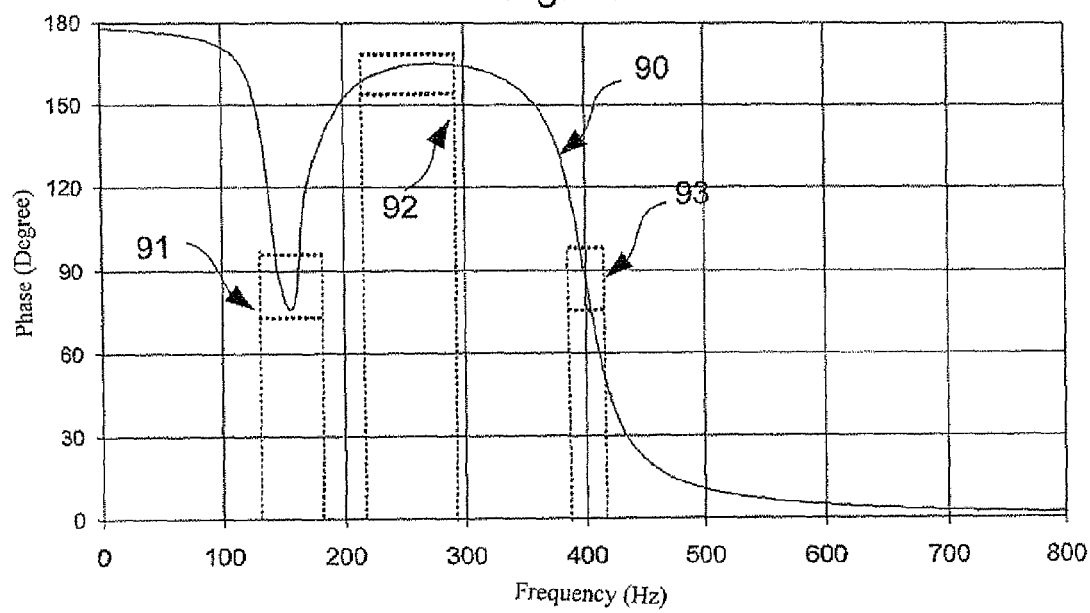

METHOD AND DEVICE FOR CONTROLLING THE QUALITY, IN PARTICULAR THE STIFFNESS AND THE PHASE, OF A HYDRO-ELASTIC JOINT

This application is a national stage application under 35 U.S.C. §371 of PCT Patent Application Serial No. PCT/EP2009/002733, filed on Apr. 14, 2009, and claims priority to French Patent Application No. 0852465, filed on Apr. 11, 2008, the entire contents of both of which are hereby incorporated by reference.

The invention is related to a process and a device for controlling the quality, in particular the stiffness and the phase, of a hydro-elastic joint. The most common field of application of these devices is the field relating to establishing ground contact of automobiles or utility vehicles, in particular when they are used as spacers between cradle and chassis or as motor support or as torsional vibration absorber in transmission elements or elements for establishing ground contact of the vehicle.

In the following, for these spacers, supports or articulations the generic term "elastic joint" will be used except in cases of descriptions for specific particularities of one or the other products.

These elastic joints are located at the interface of two parts to be connected and are intended to filter and shift the phase of vibrations transmitted between one and the other of the parts to be assembled. These elastic joints usually consist of two metal support elements with a first outer support element of cylindrical shape having any profile, and a second support element also of cylindrical shape and being located to a large extend at the inside of the volume defined by the first support element. These two support elements are connected to each other by rubber or elastomer parts and other parts made of plastic or metal if appropriate. Occasionally, the shape and the arrangement of the parts between the two support elements is such that one or several hermetic hydro-elastic chambers are disposed between the two support elements, which are communicating with each other through calibrated orifices and are filled by a watery or glycol type liquid or by a gas. The components between the two support elements form a generally indismountable unit with the latter. It is this unit which is referred to as "elastic joint". The elastic joint has a theoretical principal working axis which in certain types of elastic joints coincides with the axis of symmetry of the two support elements. This theoretical working axis is the axis of axial or radial movement of one support element with respect to the other one during operation on the vehicle or the axis of rotation of one support element with respect to the other one during operation on the vehicle. This supposes that the elastic joint is not subject to eccentric loadings or interference loads tending to deform the elastic joint. Elastic joints formed as described above are the object of the process and the device according to the present invention.

The inner and outer support element of the elastic joint are respectively attached to the two parts to be assembled. The dynamic vibration passed from one part to the other are thereby forced to pass through the mixed system "rubber, plastic and possibly hydro-elastic chambers" disposed between the two support elements and connecting the latter. From this follows the occurrence of a phase shift between input signal and output signal, this phase shift being variable with the excitation frequencies. Thus becomes apparent the importance of the quality of filtration of this system with respect to the different possible excitation frequencies; an elastic joint with a manufacturing fault could be considered to be good concerning phase shift at a certain frequency and considered bad at another frequency. Thus, the quality of filtration of an elastic joint is of vital importance for the comfort of the vehicle across the whole range of considered frequencies.

In the present state of the art, for quality control of elastic joints in manufacture, a servo-hydraulic machine is used that applies a sinusoidal movement of constant amplitude and frequency to one of the support elements, and on the other support element the phase of the outgoing signal is measured. These outgoing signal values depend on the frequency of the input signal and substantially change with the frequency in a non-proportional way. Attached FIG. 13 schematically shows the principal of functionality of the prior art technique for testing the quality of an elastic joint. The elastic joint a comprises a first support element b and a second support element c. The first support element is connected to the second support element by a spring d and in parallel by a damper e. The first support element b is fixed and the second support element c is excited by a frequency generator with a constant amplitude, an increasing frequency and predetermined force f. The characteristics of the elastic joint are determined by scanning through the frequencies. A scan through the frequencies requires a very long time, for example much more than 30 seconds. Besides, the instruments for performing such a frequency scan are extremely expensive. In order to avoid spending too much time by checking these values, often the tests are limited to a few defined sinusoidal input signal frequencies, sometimes one single frequency. Consequently, one accepts possible quality drifts of the elastic joint for other frequencies. These tests on different frequencies are referred to as "control points". Even when limiting the tests to a few control points, cycle times of more than 10 seconds are reached for testing one elastic joint, which is too much to integrate such testing machines into the production line. Thus, tests have to be performed in a re-working procedure in another workshop apart from the production line without the possibility of an immediate action on the quality of the upstream operations in order to correct a possible drift. It seems economically impossible to achieve continuous testing with an immediate influence on the upstream production process of support elements.

On the other hand, car manufactures who buy these elastic joints only ask for respecting their specifications across the whole frequency range; if for example they specify a minimum stiffness that should not exceed a certain value in a certain frequency range, it may happen that by testing the elastic joints at a single, precise frequency with the current method, the part is wrongly declared bad because the elastic joint has not been tested at neighbouring frequencies. Inversely, an elastic joint can be wrongly assumed good from a single positive control point even though the frequency response shows derivations in other frequency ranges. Thus, it would be necessary to increase the number of measurement points, which however is not industrially feasible.

Finally, in the current state of the art, the sinusoidal movement is applied to an elastic joint at a defined area of the latter and in a defined direction. Yet, these elastic joints have several degrees of freedom and sometimes have a working direction on the vehicle slightly out of line with respect to their own axes of symmetry. The current testing machines do not allow such tests in eccentric positions in an industrial and economic way.

The patent application US 2003/0172714 A1 discloses an apparatus and a procedure for evaluating an absorber. The apparatus uses an arm to which a hammer is attached that falls, driven by gravitational force, from a pre-determined rest position onto the vibration absorber in order to produce an impact. A frequency analysis is used for determining the resonance frequency. In addition, a good product can be distinguished from a bad product from a maximum value of a spectral analysis. The process disclosed in this patent application does not allow testing the characteristics of a hydraulic member of a hydro-elastic joint. Moreover, the control cycle is limited by the displacement time of the arm from an impact position to the rest position and by the falling time.

It is an object of the invention to provide a process and an arrangement for testing the quality, in particular the damping characteristics of the hydraulic member of a hydro-elastic joint in an extremely short cycle time.

The first claim concerns the process: this process is the usage of an impact instrument within the production line and without slowing the production frequency, being improved over the prior art, impacting on a first support element for a duration of less than 15 milliseconds. The process is combined with the analysis of the response of the same support element concerning stiffness and phase over the total frequency range between 0 and 2000 Hz, more generally between 0 and 1000 Hz, and with the simultaneous identification of good and bad joints with indication of the nature of the possible malfunctioning, while the second support element is kept fixed during the whole test by means of an external clamping device wherein the total time including the positioning of the elastic joint, its removal after the impact and the measurements amounts to less than 10 seconds. The frequential analysis of the outgoing signal of one of the support elements, when applying an impact on it, conveniently allows total or partial comparison with a permissible bandwidth in order to automatically detect the points outside tolerance and the frequency at which they occur. The technique of impacts, also known as "instrumental hammer" or "impulse test" is known for a long time. The theory is based on use of a very short impact, similar to a Dirac impulse, intended to excite a structure, and on the Fourier transformation of the response of this structure over an entire frequency range. The method is applied for example to testing the functionality or the integrity of parts as in the U.S. Pat. No. 4,342,229 of 3 Aug. 1982, the patent WO/2006/074506 published on 20 Jul. 2006 or the patent JP 2006292481 published on 26 Oct. 2006. However, to our knowledge, this technique has never been used to test a large production series of elastic joints with or without hydro-elastic chambers, to analyse simultaneously the impact and its effect with respect to displacement, load and phase shift on one and the same support element while simultaneously sorting the joints in good ones and bad ones without slowing down the frequency of the production line. The invention is thus a new application of an existing process to the domain of elastic joints in order to integrate testing into the production line while respecting a cycle time of less than 10 seconds and in order to enable the error-free segregation of bad elastic joints without risk of wrongly rejecting good joints and to be able to acquire knowledge about the origin of the non-conformity through analysis of the results.

In one embodiment, the invention relates to a process for testing the quality, in particular the stiffness and the phase, of an elastic joint for connecting two other parts while filtering vibrations transmitted between these two other parts. Said elastic joint is meant to work in axial, radial or torsional direction, disposing or not disposing of one or more hydro-elastic chambers, in particular filled by a hydro-fluid, such as a hydro-liquid or a hydro-gas. The elastic joint is composed of two concentric cylindrical support elements, the inner support element being located to a large extend inside the volume defined by the outer support element, the two support elements being connected by a set of components made of rubber or elastomer and, if applicable, of plastic and metallic parts, wherein said support elements are themselves respectively attached to the two other parts which the elastic joint connects. In the process a technique of testing by impact is applied within the timing of the production line of the elastic joint, i.e. less than 10 seconds per cycle, for distinguishing good joints from bad ones through a frequential analysis of the oscillations of the impacted area of the elastic joint. The values of the phase shift of the frequential analysis are compared with a bandwidth of permissible phase shift. For example, the bandwidth of permissible phase shift may be defined by an envelope.

Typically the values for the phase shift yielded by the frequential analysis are compared in at least one given, limited frequency range, the given frequency band being located in particular within the total frequency range from 0 to 2000 Hz. In another embodiment, the values of the phase shift yielded by the frequential analysis are compared to at least one limited frequency range or at least two given, limited frequency ranges, wherein the given, limited frequency range is in particular within the range of the total frequency of 0 to 2000 Hz, wherein in particular the given, limited frequency ranges are spaced apart from each other in particular by at least 10 Hz.

For example, a limited frequency range is defined around a frequency value of a relative maximum and/or a relative minimum of the phase shift in particular of a reference curve for the phase shift.

In one embodiment a frequency range extends from about 100 Hz to about 200 Hz, in particular between about 120 Hz and about 180 Hz, from about 200 Hz to about 300 Hz, in particular between about 220 Hz and about 290 Hz and/or from about 350 Hz to about 450 Hz, in particular between about 370 Hz and about 430 Hz. In another embodiment the values of the phase shift or of the module of several limited frequency ranges are compared to reference values, for example a permissible bandwidth.

In another example, a frequency range is defined around a transition frequency value from 90 to 180 degrees of phase shift of a reference curve.

In another embodiment the invention relates to a process for testing the quality, in particular the stiffness and the phase of an elastic joint for connecting two other parts while filtering the vibrations transmitted between these two other parts, said elastic joint being for work in axial, radial or torsional direction and disposing or not disposing of one or more hydro-elastic chambers, particularly filled with a hydro-fluid such as a hydro-liquid or a hydro-gas, the joint being composed of two cylindrical, concentric support elements, wherein the inner support element is to a large extend located inside the volume defined by the outer support element, the two support elements being connected by a set of rubber or elastomer components and, if applicable, of plastic or metallic parts. Said support elements are themselves respectively attached to one of the two other parts which the elastic joint connects. Therein a technique of testing by impact within the timing of the production line of the elastic joint, i.e. less than 10 seconds of cycle time, is applied for distinguishing good joints from bad ones through a frequential analysis of the oscillation of the impacted area of the elastic joint within in a total frequency range of particularly between 0 and 2000 Hz, characterised in that the values of the frequential analysis module are compared to a permissible module bandwidth that envelopes a curve of a reference module within a limited frequency range, in particular between about 50 and about 250 Hz. The limited frequency range is included in the total frequency range and is defined around a frequency of a first resonance peak of the reference curve, wherein the frequency of the first resonance peak has a frequency below a frequency value of a second resonance peak of the reference curve.

In one embodiment a limited frequency range extends from about 50 Hz to about 250 Hz, particularly between about 100 Hz and about 200 Hz.

In an example of an embodiment, the module values yielded by the frequential analysis of the tested elastic joint, in particular in the limited frequency range, form a curve, the curve featuring a relative maximum and then a relative minimum, the frequency of the relative minimum being compared to a predetermined frequency band, in particular the frequency band between about 140 and about 150 Hz, the frequency preferably being in the frequency band predetermined for good joints and/or the second curve features a relative maximum and then a relative minimum, wherein the relative minimum value is compared to a predetermined value, the relative minimum value in particular being lower or equal to the predetermined value for good joints.

For example, in one embodiment, the module values yielded by the frequential analysis of the oscillation of the impacted support element are compared in two limited frequency ranges, the first limited frequency range being defined around the frequency of the first resonance peak of the reference curve and the second limited frequency range being spaced apart from the first limited frequency range, in particular by at least 100 Hz.

In one embodiment the second limited frequency range is defined around the frequency of the second resonance peak of the reference curve, being in particular the absolute maximum of the reference module curve, preferably between about 350 and about 450 Hz, and/or the second limited frequency range extends from about 500 Hz to about 800 Hz, in particular between about 550 Hz and about 700 Hz. In one embodiment the module value of the first peak is less than the module value of the second peak.

In another embodiment, the reference curve of the module or of the phase shift in the frequency space is generated by an impact analysis of a good elastic reference joint or by a numeric simulation of a good reference joint.

In one embodiment, the permissible frequency band enveloping the curve of the module or of the phase shift is formed from a curve of maximum module or phase shift values and from a curve of minimum module or phase shift values, the curves of maximum and minimum module or phase shift values having in particular a distance between each other of less than about 15 percent of the maximum value of the module curve of the reference phase shift, in particular of less than about 10 percent, preferably of less than about 5 percent.

Furthermore, the present invention refers to an arrangement for testing the stiffness or the phase of a hydro-elastic joint, the joint being intended to connect two other parts while filtering the vibrations transmitted between the two other parts, said elastic joint being intended to work in an axial, radial or torsional direction, disposing of or not disposing of one or several hydro-elastic chambers, particularly filled by a hydro-fluid such as a hydro-liquid or a hydro-gas and being composed of two concentric cylindrical support elements, the inner support element being located to a large extend inside the volume defined by the outer support element, the two support elements being connected by a set of rubber or elastomer components and, if applicable, of plastic and metallic parts. Said support elements are themselves respectively attached to two other parts which the elastic joint connects, wherein the arrangement comprises an impact head for exerting an impact onto one of the support elements, and a support for keeping the elastic joint clamped without permanent deformation at its other support element, which thereby is immovably attached, characterised in that the arrangement comprises among other things a magneto-electric actuator for accelerating the impact head onto the support element.

In one embodiment, the arrangement is designed to exert an impact load onto the elastic joint of between 180 N and 300 N, preferably between 200 N and 270 N, in particular around 210 N.

The claimed arrangement, associated with the claimed process allows to control in real time the impact exerted onto the support element such that it is always executed without rebound and within a period substantially equal to the stored set value, being itself less than 15 milliseconds, and that the spectrum of the impact load and its level are conform with the stored set values. Thus, the impact process and impact device of the present invention are an improvement over the prior art because the device is able to control itself, that is to control its own impact process besides the test of the product "elastic joint".

Within the field of quality control by impact, this process is distinguished over the prior art also by the fact that the position of the impact point on the chosen support element, the other support element being fixed, can itself be selected outside the theoretical working axis or symmetry axis, while several displacement sensors are located on the chosen support element at locations such that working of an elastic joint in a slightly deformed state in the presence of centred or eccentric loads or torques is simulated; this being for taking into account the deformations of the elastic joint during real operation on the vehicle and the fact that the displacement of the elastic joint on which the output signal is measured is not always co-linear with the direction of the initial impulse. It is to be understood that the response of the different output sensors is analysed simultaneously so that the timing of the production line remains unchanged.

This process and its associated arrangement is also distinguished over the prior art relating to impact testing in that, on application of a centred or eccentric load onto the support element the displacement of which is to be frequentially analysed, the output sensors can be used in such a way that during the testing a geometry similar to real application conditions is reproduced; for example, the axis of the outer and the inner support element do not coincide anymore because of the load transmitted by the two parts to be assembled. Or for example, when the axes of the two support elements remain co-linear but one of the support elements has undergone a rotation around its axis with respect to the other support element, or one support element has been subjected to a movement along its axis relative to the other support element. It is to be understood that the applied loads remain low, and a permanent deformation of the elastic joint is excluded. A first variation for testing a slightly deformed elastic joint consists of mounting the output sensor onto an elastic, calibrated device and to compress this elastic device until the output sensor, abutting the support element to be analysed, indicates the force with which one intends to push said support element. The output sensor therefore has to be of the active type so that it can convert the variations in load into voltage variations. The impact force itself must be larger than the force exerted by the sensor onto the support element on which it is applied. If one wants to avoid pushing directly with the sensor(s), another variation consists in exerting the load on the support element to be impacted by means of a device independent from the output sensors; for example, a calibrated spring or any other elastic device of which the characteristic load-displacement curve is precisely known. In this case, during the measurement process, the output sensor(s)

are fixed by a magnet device onto the support element of which the impact response is analysed. Laser sensors, which do not require direct contact with the support element, may also be used.

It is to be understood that the impact force will in any case be chosen such that there is no risk to permanently deform or damage the elastic joint.

The arrangement can also be conceived in such a way that the output sensor(s) automatically come into contact with the support element of which the displacement is to be measured by frequential analysis. This condition will conveniently be fulfilled by the usage of a magnetic support element attached to the sensor, wherein the magnetic support element will attach itself onto a defined area of the support element in question and will preferably geometrically cooperate with a section of this support element in order to always well-position the sensor. This arrangement is useful for piezo-electric sensors. Another solution consists of pressing the sensor with a precise force onto a predetermined location on the support element where the displacement is to be measured by frequential analysis in a way that said force causes a reversible deformation of the elastic joint and thus approaches certain conditions of usage when the joint is in service. It shall be understood that it is also possible to measure the output signal by contactless laser sensors or by applying a mixture of different types of sensors, some comprising simple magnetic contact, others being capable of exerting a load and others being contactless.

The following description will contribute a certain amount of details or variations to the above explained principle characteristics and show some examples of devices corresponding to the present invention.

Figure 6:
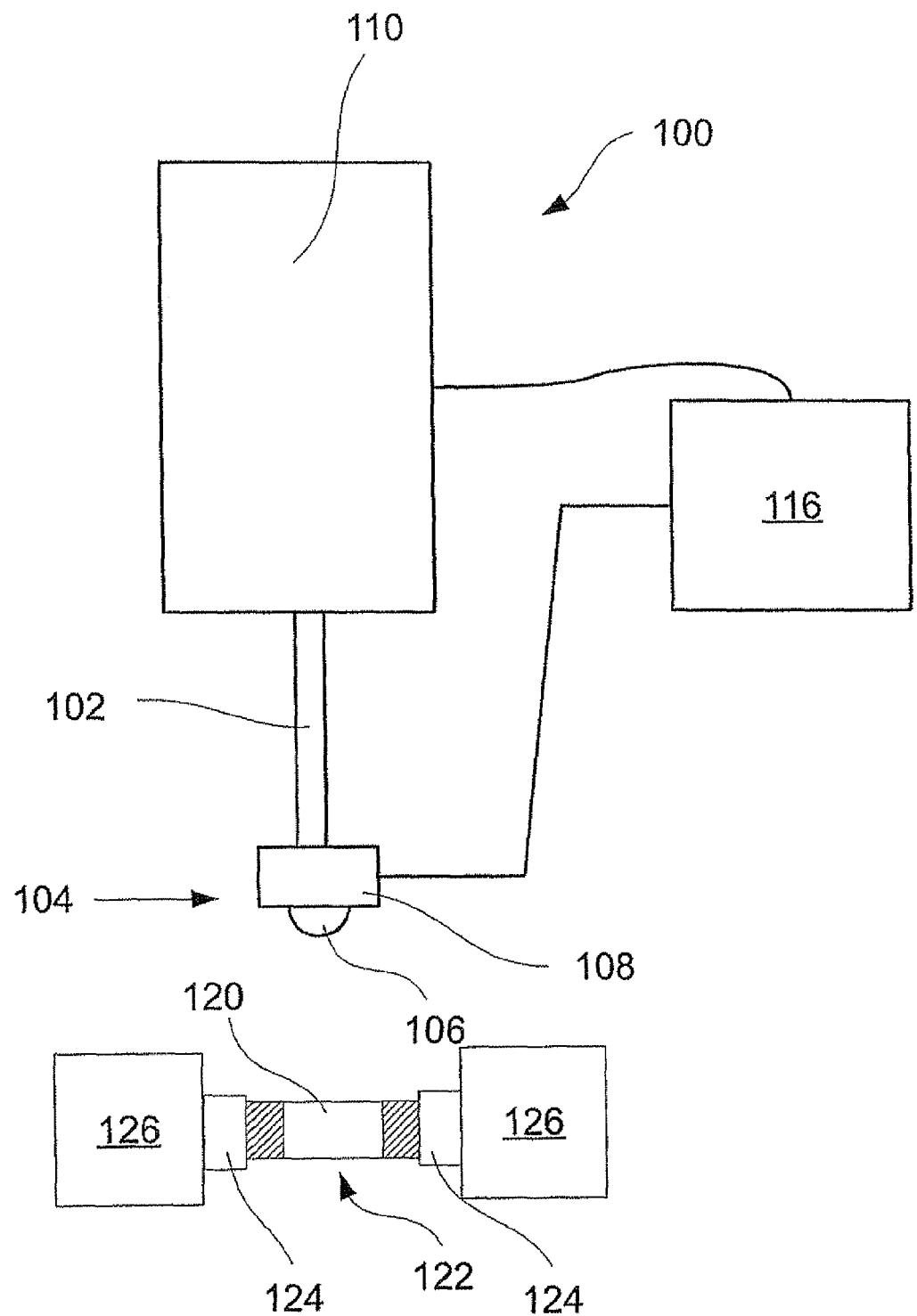

FIG. 6 schematically shows another embodiment of the impact system.

Figure 7A:
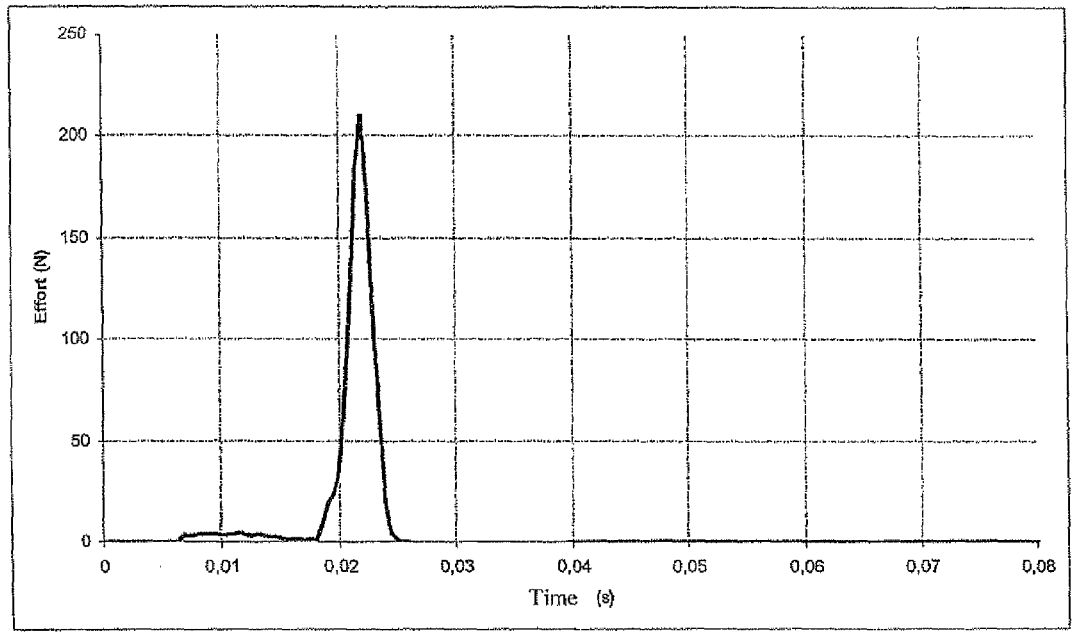

FIG. 7a shows as a curve the signals yielded by a load sensor located inside the impact system.

Figure 7B:
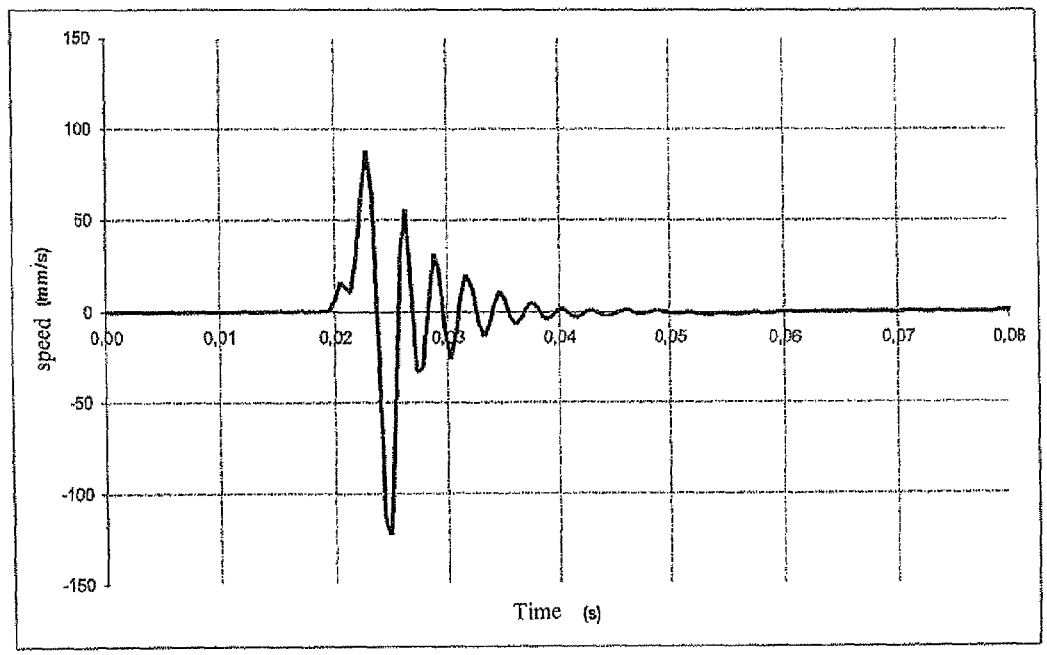

FIG. 7b shows as a curve the signals yielded by a displacement sensor.

Figure 8:
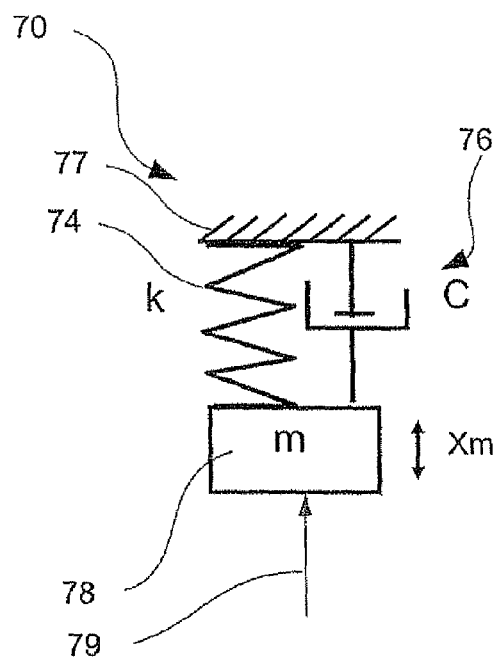

FIG. 8 shows a schematic principal of operation of a test of a hydro-elastic joint.

Figure 9:
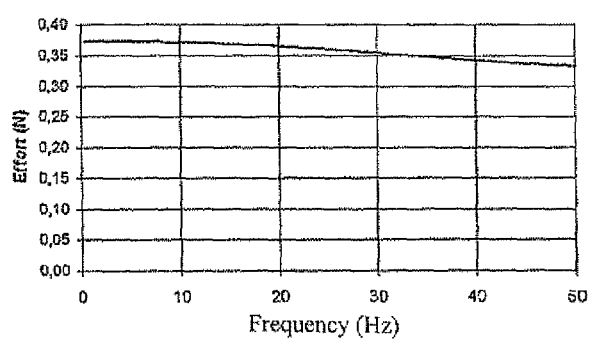

FIG. 9 shows as a curve the frequential analysis of a signal yielded by a load sensor.

FIG. 10a shows as a module curve the frequential analysis of the signals yielded by a displacement sensor and a load sensor as the support element on which they are applied is excited by an impact.

FIG. 10b shows as a phase shift curve the frequential analysis of the signals yielded by a load sensor and a displacement sensor as the support element on which they are applied is excited by an impact.

Figure 11:
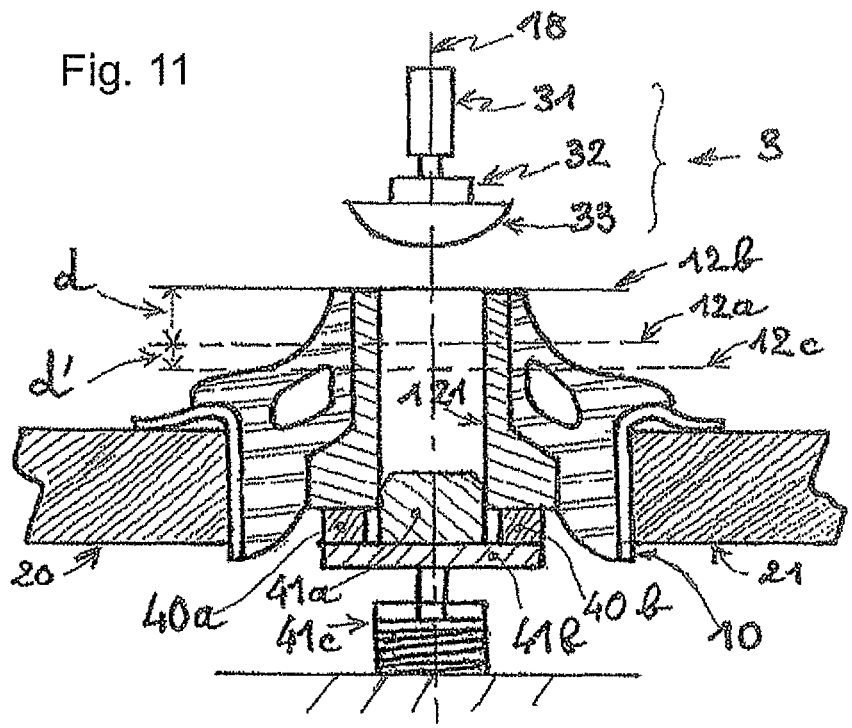
Figure 12:
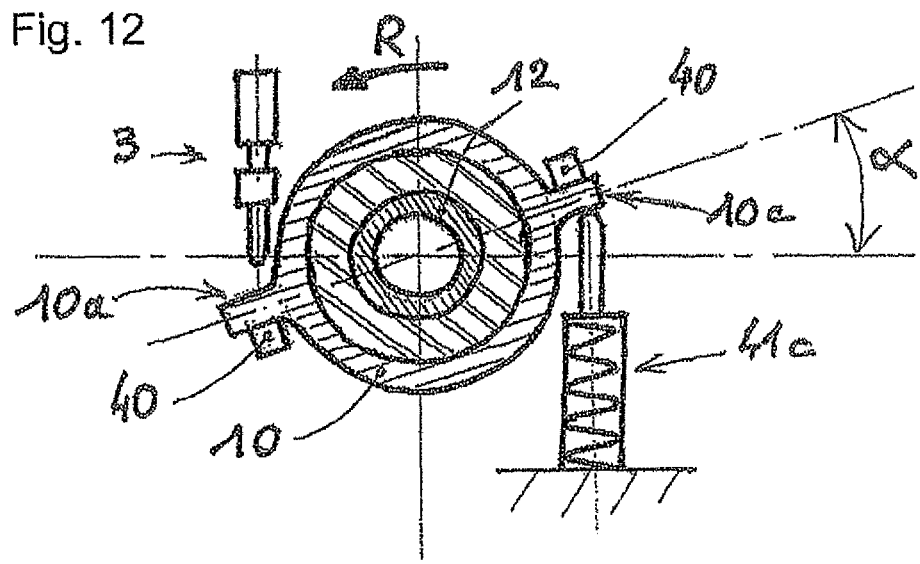

FIGS. 11 and 12 schematise the application of the present process to elastic joints purposely deformed by translational or rotational displacement of one support element with respect to the other.

Figure 13:
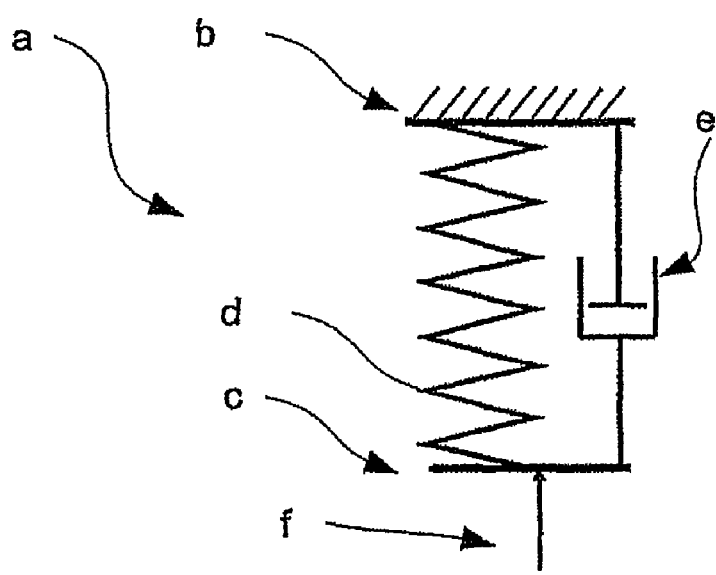

FIG. 13 schematically shows the principal of functionality of the prior art technique for testing the quality of an elastic joint.

Figure 1:
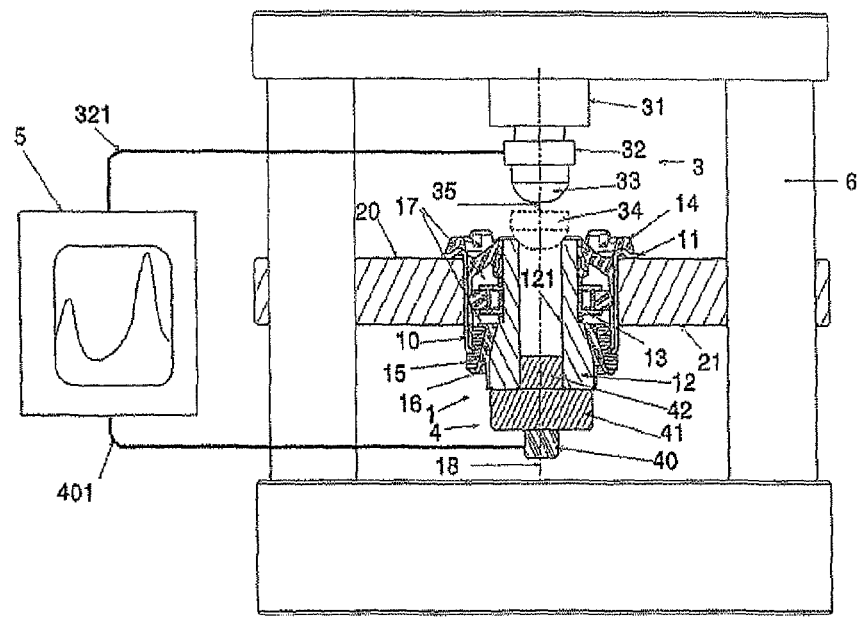
FIG. 1 is a schematic sectional view of a device according to the present invention for testing an elastic joint with an axial working direction of the hydro-elastic support sprag type.

In FIG. 1 the hydro-elastic joint 1 consists of an outer cylindrical metallic support element 10 having a folded down collar 11, of an inner support element 12 originally coaxial with the outer support element 10, a plastic spacer 13 fitted onto the inner support element 12, several elastomeric sections 14, 15 and 16, treated for enhanced adherence and glued or fitted on one or the other one of the support elements, and finally of two hydro-elastic chambers 17. In the present case, the elastic joint 1 has a theoretical work axis 18 that also is the axis of symmetry of the elastic joint. During the production cycle, this elastic joint is placed between two shells 20 and 21 that squeeze the elastic joint at its outer support element 10 with sufficient force to avoid any sliding during the impact while also avoiding any permanent deformation of the elastic joint. In the case presented, the circular collar 11 of the outer support element 10 rests on the two half shells 20 and 21; yet certain similar elastic joints do not have a collar and it is thus important to control well the holding force exerted by the two half shells 20 and 21 onto the support element they are holding. These half shells 20 and 21 can adopt several shapes and means for closing and clamping. They must however have a sufficiently large mass and stiffness in order not to disrupt the analysis of the output signals.

The impact system is represented by the assembly 3 comprising a special cylinder 31, a load sensor 32 disposed between the output rod of the cylinder and an impact head 33. When the impact is triggered, the system 3 fires the head 33 against the inner support element 12 according to direction 35, which, in the case presented, is in itself aligned with the theoretical working axis 18 of the elastic joint. The head 33 is represented in this figure as 34 during the impact, and the contact with the inner support element occurs uniformly on the rim of the inner bore 121 of the support element. Once the impact has occurred, the system 3 instantaneously pulls back in order to avoid continuation of contact of the head 33 on the elastic joint. Disposing the impact system somewhat more to the right or to the left of the theoretical work axis 18 will not be outside the scope of the present invention. In this case, the impact created by the hit between the head 33 and the inner support element 12 will occur eccentrically with respect to the axis 18. Also, in case that it suits better the shape of the elastic joint and the impact procedure, flanging the inner support element 12 of the elastic joint and applying and the displacement measurements on the outer support element 10 will not be outside the scope of the present invention. In this case, it is the inner support element 12 that needs to be rigidly attached, for example by means of an expandable chuck introduced into the bore 121 of the inner support element and then blocks this support element during the impact test on the outer support element 10.

In FIG. 1 the system for measuring the effects of the impact on the support element 12 is represented by numeral 4; the system comprises an output sensor 40 measuring the acceleration of the inner support element 12. The output sensor is attached to a small magnet 41, of which a small cylindrical portion 42 is fitting into the bore 121 of the inner support element 12 so that once positioned, the sensor 40 will always return to the same position. Once the measurement is terminated, a small system not represented here will pull the section 42 out of the bore 121 in order to disengage the sensor 40 from the elastic joint 1.

In one embodiment, the output sensor 40 can be a speed sensor in order to record the oscillations of the impacted support element.

The impact sensor 32 and the acceleration sensor 40 are both respectively connected to a data acquisition unit and to a computer 5 by the connections 321 and 401. The computer 5 enables the frequential analyses of the output signal with respect to the input signal using Fourier transformation. In this way, for all the frequencies of the range usually stretching from 0 to 2000 Hz, the accelerations, stiffnesses, peaks of amplification or dampening and the corresponding phase shifts are detected for the support element 12 when it is excited by an impact. Here the limit of 2000 Hz is given as an indication and depends on the type of elastic joint and of the specifications provided by the client; in certain applications the limit will be 800 Hz and in others 1000 Hz or 1500 Hz.

The whole of this device is attached to a frame 6. The application of the device according to the invention consists of manually or automatically placing the elastic joint 1 between the half shells 20 and 21, tighten the latter onto the outer support element of the elastic joint, release the impact onto the inner support element 12 and measure the displacement or accelerations of this support element 12 while it is excited by the impact. Upon termination of the measurements the two half shells will move apart to enable disengagement of the elastic joint which, according to it being good or bad, will be manually or automatically guided into the appropriate bin.

Figure 2:
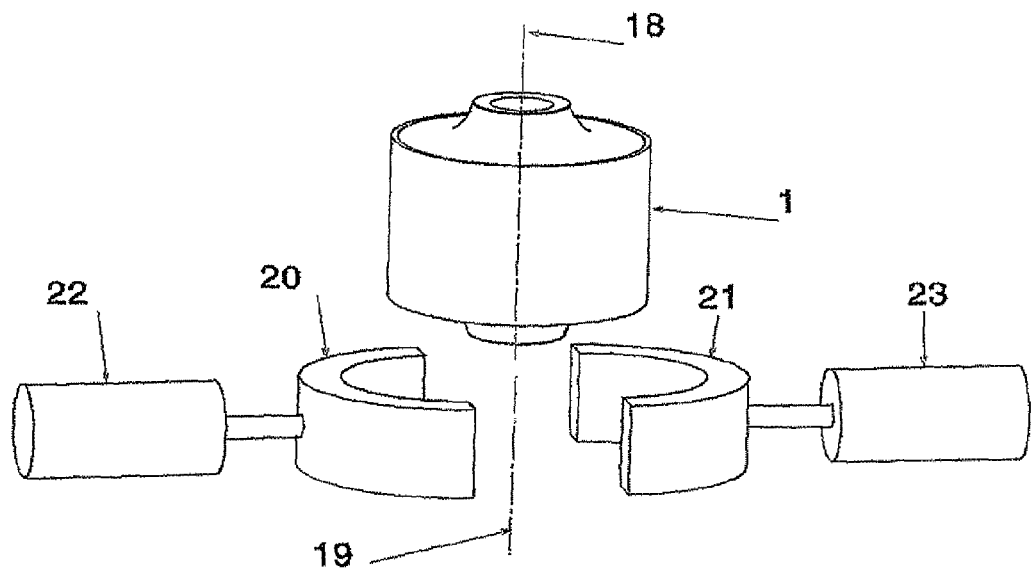
FIG. 2 is a schematic perspective view of the way of clamping the elastic joint of FIG. 1 into its test installation.

FIG. 2 is a schematic view of the system for holding and clamping an elastic joint according to the present invention. The elastic joint 1 is placed between the two half shells 20 and 21 in a way that the axis 18 of the elastic joint substantially coincides with axis 19 of the device. One of the two half shells, for example shell 21, can be put already in a fixed or almost enclosed position in order to facilitate positioning of the elastic joint 1. Subsequently, the two half shells close upon each other onto the elastic joint 1 and clamp its outer support element 10. The two axes 18 and 19 are thus coinciding.

Figure 3:
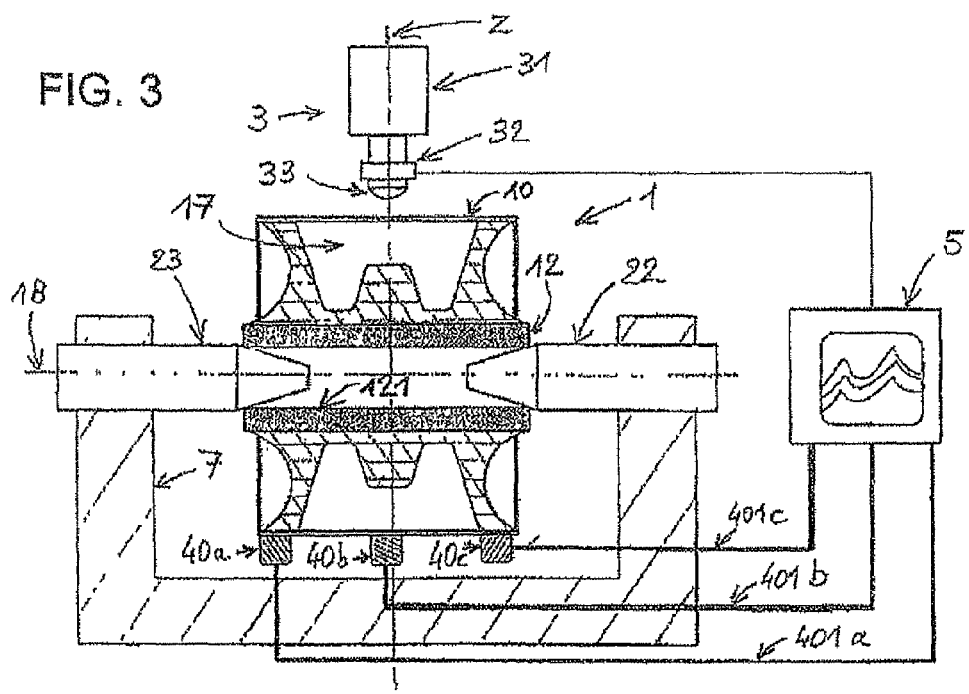
FIG. 3 is a schematic sectional view of a device according to the present invention for testing a hydro-elastic joint of the bearing type with a radial working direction.

FIG. 3 shows the application of the present invention to another type of elastic joint. This type of elastic joint is intended to work radially and not axially. This time, the inner support element 12 is rigidly held by two tips 22 and 23 positioning and squeezing the element at its bore 121. Here numeral 17 indicates hydro-elastic chambers, yet it is recalled that if the elastic joint does not have such chambers this will not depart from the present invention. The impact device 3 is represented as co-linear with the axis Z radially passing through the middle of the elastic joint. Without departing from the scope of the present invention, the impact axis 3 of the system can also be shifted in order to produce the impact towards one or the other end of the outer support element 10. In this way, the vibrational behaviour of the support element 10 can be examined when it is exposed to an impact forcing it into a partially conic movement, i.e. when the axis 18 of the inner support element is not the same anymore as that of the outer support element 10.

Three displacement sensors, respectively 40a, 40b, and 40c are disposed on the periphery of support element 10. These sensors are preferably disposed on a cylinder surface line that forms support element 10 and which is opposite the surface line on which the impact is produced. It is however possible to dispose these sensors on other surface lines in order to take into account a transverse displacement of the support element 10, in particular if one wants to be sure that the elastic joint has a homogenous radial behaviour. The three sensors are attached on the elastic joint with a magnet or else are contactless laser type sensors. The scope of the present invention will not be departed if instead of three sensors any number of sensors is placed onto the joint, provided that the data acquisition and treatment system 5 for the signal is capable of simultaneously processing all the transmitted information within a delay of less than 10 seconds, in which positioning of the elastic joint onto its measurement installation 7, impact and removal of the elastic joint after the measurement are included. The data from the spring balance 32 is transmitted to the data processing centre 5 by the connection 321. The data of the sensors 40a, 40b and c are transferred separately by means of their respective connection 401a, b, and c.

Figure 4:
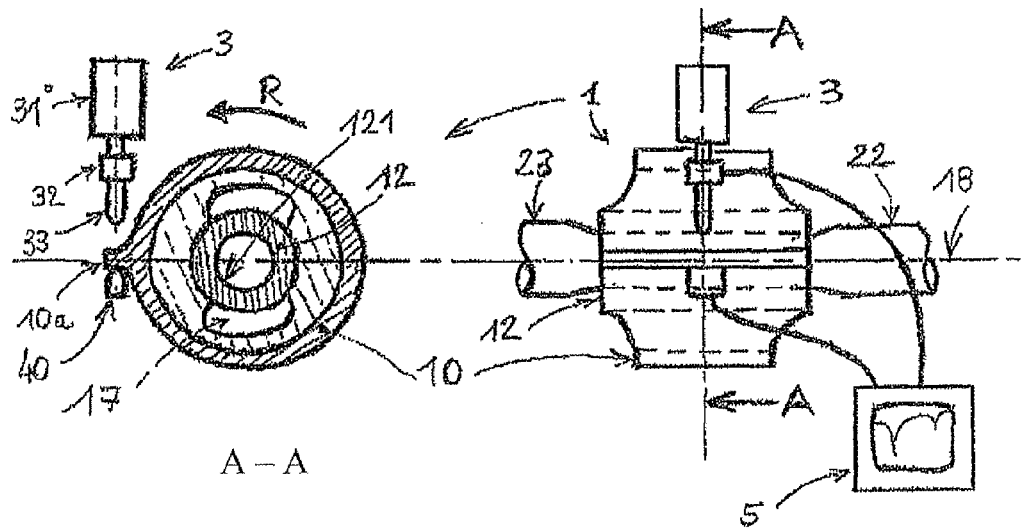
FIG. 4 is a schematic sectional view of a device according to the present invention for testing a bearing with a torsional working direction.

FIG. 4 shows a way of applying the present invention to torsionally operating elastic joints. The left view is a sectional view AA of the right view. The operating mode of these elastic joints consists of rotating one support element with respect to the other one and of dampening and shifting the phase of the relative movements through the presence of an elastomer and hydro-elastic chambers between the two support elements. As previously, the two support elements are respectively attached to two other parts thus allowing their connection while filtering the vibrations transmitted from one to the other. The elastic joint always has an outer support element 10 and an inner support element 12. The two support elements are cylindrical and concentric with respect to the rotational axis 18. The inner support element 12 is held clamped and immobilised by the two tips 21 and 23 that push onto the bore 121 of the inner support element 12. The inner support element 12 can also be clamped by any other means, such as an expandable chuck reaching for example into the bore 121 without departing from the scope of the present invention.

The outer support element 10, being driven to rotate around the inner support element 12 during operation, is usually provided with one or several projections 10a allowing the transmission of a rotational movement in a direction R. Without departing from the scope of the present invention, also several projections for a detent mechanism or a succession of gear teeth may be used, wherein all these forms are possible and usually determined according to the way in which the outer support element is attached to the corresponding part. In FIG. 4 a single projection 10a is represented for simplification. An impact is produced onto this projection by a tip 33 operated by the impact system 3. While the inner support element 12 is fixed to the measurement instrumentation, the outer support element 10 will move as a result of the excitation due to the impact. A movement and acceleration sensor 40 will record the output signal which will be processed by computer 5 at the same time as the signal coming from the spring balance 32 of the impact system 3. If the frequential analysis of the output signal indicates an anomaly, the elastic joint will be declared bad.

Figure 5:
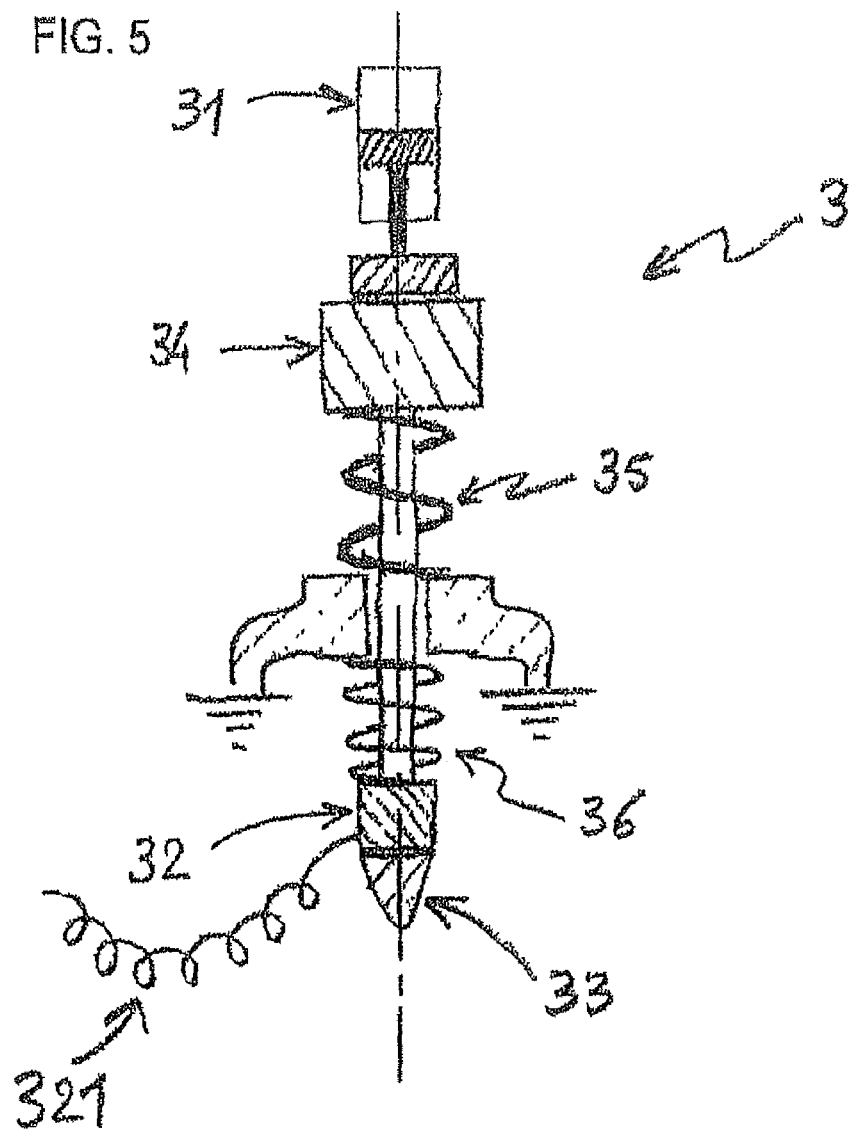
FIG. 5 shows in detail a specific embodiment of the impact system.

FIG. 5 is a schematic representation of an impact generator 3. A cylinder 31 drives a mass 34 at the end of which a spring balance 32 and the impact device itself 33 is located. Two springs 35 and 36 enable changing the speed and the energy of the impact in order to adapt the impact to the type of elastic joint to be tested within the production line. This device will not be described in further detail, with the exception that the signal issuing from the spring balance 32 via the cable 321 is not only used for the frequential analysis of the relation between the input signal and the output signal but also for verification whether the impact has been singular, without rebound and precisely within the set value concerning the load, the level and the duration of the impact. This arrangement allows a self-test of the measurement process in the case that for example the tip 33 would become blunt, would break or the springs 35 and 36 would not fulfil their task anymore or in case that the cylinder 31 would not function correctly.

FIG. 6 is a schematic representation of another embodiment of an impact generator 100. The impact generator comprises a rod 102 with an impact head 104 at which an impact tip 106 is disposed with which an impulse is produced onto a support element 120 of a hydro-elastic joint 122. For example, the hydro-elastic joint may be the elastic joint shown in FIG. 1. The hydro-elastic joint comprises a second support element 124 that is held by the support member 126. The impact head 104 comprises among other things a load sensor 108 attached to the rod, in particular in form of piezo-electric sensor. Among other things, an electro-magnetic actuator 110 is arranged to generate a displacement of the rod. The rod, the impact head, the impact tip and the load sensor together form a movable portion of the impact generator. The movable portion can be moved from a first rest position to a second impact position where the impact head impacts onto the elastic joint. In one embodiment, a spring can pull the mobile portion back into the rest position after each impulse. The mobile portion and thus the impact head is accelerated by the electro-magnetic actuator. The load of the impact generator is controlled by a controller 116.

For example, the impact generator may produce a load of 250N onto the elastic joint. In one embodiment, the load range is between 180 and 300 N, preferably between 200N and 270N, for example around 210 N. The load to be applied onto the elastic joint to be tested is variable and can be adapted to the elastic joint to be tested. In one embodiment, the load sensor 32 may be a piezo-electric sensor. The impact and the load of the impact generator may be produced and controlled by the electro-magnetic actuator.

FIG. 7a shows a curve of an impact produced onto an elastic joint over time. The impact hits the elastic joint somewhat before 20 milliseconds with a maximum load of about 210 N. The impact last between 5 and 8 milliseconds. The elastic joint is excited by the impact generator and performs a dampened oscillation. This dampened oscillation is stored by the displacement sensor 40. FIG. 7b shows an output signal of the displacement sensor 40 of the elastic joint excited by the impact shown in FIG. 7a in the shape of a dampened oscillation. Thus, FIG. 7b shows the impulse response of an elastic joint over time.

If an object is excited by a Dirac impulse it is possible to deduce from the impulse response the transfer function of the object. For example, if an elastic joint is excited by an impulse it is possible to deduce the transfer function of the elastic joint from the impulse response. The transfer function depends on the characteristics of the elastic joint, for example on a stiffness constant or a dampening constant. Thus, it is possible to derive its characteristics from the impulse response. It is therefore important to know a theoretic model of the elastic joint in order to simplify the calculations.

FIG. 8 shows a principle of schematic functioning of an impact test of a hydro-elastic joint. The elastic joint 70 comprises a spring 74 and a damper 76 which are connected in parallel between a first support element 77 and a second support element 78 having a mass m. The spring 74 has a stiffness constant k and the damper 76 has a damping constant C. The first support element 77 is fixed and the second support element 78 is impacted by a load 79. After the impact, the second support element performs an oscillation with a decreasing amplitude. The value of the displacement of the second support element 78 is referred to as Xm.

In a mathematical model, the elastic joint can be described with a second order differential equation:

$$m\ddot{x} + C\dot{x} + kx = F_0 \cos \omega t$$

From the differential equation it is possible to derive the displacement equation of the mass 78:

$$Xm = \frac{F_0}{\sqrt{(k - m\omega^2) + C^2 \omega^2}}; \text{ and } tg\varphi = \frac{C\omega}{k - m\omega^2}$$

From the displacement equations of the mass m, the stiffness constant k of spring 74 and the damping constant C of damper 76 can be calculated:

$$k = \frac{F_0}{Xm} \times \frac{1}{tg\varphi\sqrt{1 + \frac{1}{tg\varphi^2}}} + m\omega^2$$

$$C = \frac{F_0}{Xm} \times \frac{1}{\omega\sqrt{1 + \frac{1}{tg\varphi^2}}}$$

Thus, from the transfer function of the elastic joint, load/Xm (displacement of the elastic joint), it is possible to derive the parameters k and C. It is to be noted that the stiffness constant and the damping constant depend on the frequency φ and the phase shift 5. In a production set of an elastic joint it is important to know the characteristics in one or several given frequency ranges in order to determine the faulty products and the ones without fault.

FIG. 9 shows the impulse of the impact generator in the frequency domain from 0 to 50 Hz. In the frequency domain the impulse of the impact generator is nearly constant with a slight slope. A perfect Dirac impulse would be constant in the frequency domain. FIG. 10 summarises and compares the curves yielded by the frequential analysis when the method of impact according to the present invention is used. In contrast to the current method which uses a generator of a sinusoidal signal with a constant amplitude and with which generally only three points of stiffness measurements and phase shift measurements at three different frequencies are performed, with the present invention a graphic output of the frequential analysis is used, giving the module and the phase across the whole rang of frequencies. The module is defined as the ratio between the acceleration of the support element excited by the impact on the one hand and the load exerted by the impact on the other side.

The module curve as a function of the frequency is represented by the curve 80 in FIG. 10 a. The computer for analysis of the results memorises and possibly displays on the screen a certain number of areas for which the observance of the specification is necessary for a part to be declared good. For example the dashed line 81 indicates that between 100 and 200 Hz a small resonance is meant to occur followed by a minimum that must be assured to be less or equal to a prescribed value TFmin for a frequency Fmin being between 140 and 150 Hz for example. The curve 81 also gives a maximum value for the module given by TF Acc/F across the whole range between 100 and 200 Hz. For example, the curve produced by the frequential analysis may present a small resonance, then a relative maximum, a relative minimum and following an absolute maximum. The value of the relative minimum can be compared to the predetermined value TF Acc/F, and the frequency can be compared with the range of frequencies of 140 and 150 Hz. In one embodiment the value of the module of the small resonance may provide information on the quality or the characteristic of the hydraulic member of a hydro-elastic joint. In an example, the curve 81 corresponds to an envelope or a permissible bandwidth. The reason for the non-conformity is displayed by the computer or can be accessed by querying the latter. In the same way, it will be monitored that the module is situated between the values given by the curves 82 and 84 for the resonance peak of about 400 Hz across a frequency range defined by the curve 83. Thus, the curves 82 and 84 define an envelope. Further, these examples being non-limiting, it can be prescribed that the module curve is within an envelope defined by the curves 85 across a module range between 550 Hz and 650 Hz, giving well the example of what is called "permissible bandwidth". In one example, the permissible bandwidth or envelope, in particular the maximum permissible values and the minimum permissible values follow the module curve, in particular of a reference elastic joint. The maximum permissible values and the minimum permissible values can have a distance between them of less than 15 percent of the maximum value of the module curve of a reference elastic joint. Any elastic joint that, during the test with the impact process according to the present invention, deviates from the above described prescriptions is declared non-conform. Thus, not only the resonance frequency and the value of the peak resonance are compared with a predetermined respective value but also the damping characteristics of the hydro-elastic joint.

Thus, with the above described process, the module values are compared with predetermined reference values in several frequency bands or frequency ranges that are limited and predetermined in the frequency domain. The predetermined reference values can be for example set values or a permissible bandwidth or a predetermined envelope. A limited frequency range can be defined around the frequency of the resonance peak of a reference module curve in the frequency domain. Another limited frequency range can be defined around a frequency where the module shows a relative maximum in the frequency domain. The relative maximum can be located at a frequency lower than the frequency of the resonance peak. In one embodiment, the maximum set value around a relative maximum (see for example the dashed line 81 in FIG. 10*a*) maybe at least 5 times smaller than the maximum set value around the resonance peak (see for example the dashed 82 in FIG. 10*a*).

In one embodiment, for distinguishing the good joints from bad ones during the frequential analysis of the oscillation of the impacted elastic joint, the module curve produced by the frequential analysis is compared in at least two limited frequency ranges with a respective maximum and/or minimum value or a curve defining maximum and/or minimum values and/or a predetermined acceptable bandwidth in the limited frequency range under consideration. Preferably, these limited frequency ranges are spaced apart from each other. For example, the two limited frequency ranges can be spaced apart by 100 to 200 Hz. A limited frequency range may have a width of 30 to 150 Hz.

The curve 90, giving the result of the frequential analysis of phase, is shown in FIG. 10*b*. There again it can be prescribed that the phase shift shall be confined between a lower bound and a higher bound as given by the curves 91, 92 and 93 or within a predetermined bandwidth. In an example the curves 91, 92 and 93 define an envelope. The lower bound and the upper bound may have in an example a maximum distance between them of less than 15°. A first frequency range is defined between about 130 Hz and 180 Hz where the phase shift reference curve shows a relative minimum, in particular around a phase shift of 90°. A second limited frequency range is defined between 220 and 280 Hz where, following the relative minimum, the phase shift reference curve has a relative maximum around a phase shift value of 180°. A third limited frequency range is defined around 400° where the phase shift reference curve transits 90°. It is also possible to only prescribe a minimum at a certain frequency range and a maximum at another frequency range. In one embodiment, for distinguishing good joints from bad ones during the frequential analysis of the oscillation of the impacted elastic joint, the phase shift curve produced by the frequential analysis is compared in at least two limited frequency ranges with a respective maximum and/or minimum value or a curve representing the acceptable maximum and/or minimum values within the limited frequency range in consideration. Preferably these two limited frequency ranges are spaced apart from each other.

The reader will understand that the prescribed envelopes, minimum or maximum values are not only defined on the basis of the client specifications but also on the own experience of the manufacturer of elastic joints, taking into account possible production faults. The utilisation of the results also allows to produce statistics based on the encountered fault types, or Gaussian curves allowing to re-centre the production. With experience, the type of fault will also allow to gain knowledge about its origin; for example a lack of material in a certain area of the rubber, a leakage of the hydro-elastic chamber etc. The user of a device according to the present invention will initially test some purposely bad parts in order to calibrate the indications provided by the frequential analysis of the results. In this way, a good joint cannot be erroneously eliminated because it was tested at a certain frequency without knowing that with a few hertz more or less the parts would fall within the client specifications, a case that pretty regularly occurs with the currently available process not using the present invention.

FIG. 11 shows an elastic joint of the hydro-elastic support type, similar to the one in FIG. 1, but showing an internal deformation. The inner support element 12 has initially been moved upwardly by a value "d" under the effect of a load applied by the load and acceleration sensors 40*a* and 40*b*. The distance "d" is measured according to the theoretical work axis 18 between the top of the support element 12 in the rest position, represented as dashed line, and the top 12*b* of the same support element 12 when translationally displaced. In this deformed position under load the impact is applied onto the same support element 12 by the system 3 while the outer support element 10 is maintained fixed by the half shells 20 and 21. The load and acceleration sensors 40*a* and 40*b* are disposed on a disc 41*b* which itself is connected to a calibrated elastic device 41*c*. When the elastic joint is placed between the two half shells 20, 21, the device 41*c* pushes the disc 41*b* by up to a certain pushing force recorded beforehand by the two sensors 40*a* and 40*b*. A centering device 41*a* allows to position the sensors 40*a* and 40*b* with respect to the support element 12, hereby co-operating with the bore 121. Thus, the sensors 40*a* and 40*b* have a double function. They serve for limiting the deformation force for the elastic joint before the impact and they serve for storing the acceleration values of the support element 12 when it is impacted. Without departing from the scope of the present invention, the system can also be conceived such that the deformation of the elastic joint by translational displacement of the support element 12 is produced by the impact system 3 that firstly comes into contact with the upper side 12*a* of the support element and pushes it up the position 12*c* by a distance "d'. For this, the impact system must be mounted onto another cylinder, not represented here, that vertically actuates the assembly 3. In such a case, the sensors 40a and 40b re-adapt their simple original function as disclosed in the preceding figures.

FIG. 12 shows the same principle of beforehand deformation of the elastic joint, this time applied onto an elastic joint intended to work torsionally. Here an elastic joint similar to the one described in FIG. 4 is assumed, around which, however, prior to the impact, the outer support element 10 has been rotated by an angle α by a calibrated elastic device 41c resting on a protrusion 10c while the inner support element 12 is maintained fixed. A displacement and acceleration sensor 40 rests adhering by magnetism on the protrusion 10a and/or on the protrusion 10c. Without departing from the scope of the present invention, the sensor 40 may also be placed at any other location of the support element 10, provided that it is located opposite to the rotational movement "R" transmitted to the support element 10 by the impact. It is also to be noted that the sensor may, as for all the other applications, be of the contactless type like a laser sensor operating similar to a radar detecting the accelerations and movements.

List of Reference Numerals 1 hydro-elastic joint
3 assembly
4 system for measuring the effects
5 computer
6 frame
10 outer support element
11 down collar
12 inner support element
13 plastic spacer
14, 15, 16 elastomeric sections
17 hydro-elastic chambers
18, 19 work axis
20, 21 shells
22, 23 tips
31 special cylinder
32 load sensor
33, 34 head
35, 36 direction
40 output sensor
40 a, b load and acceleration sensors
41 magnet
41a centering device
41b disc
42 cylindrical portion
70 elastic joint
74 spring
76 damper
77 first support element
78 second support element
79 load
81, 82, 83, 84, 85 curves
90, 91, 92, 93 curves
100 impact generator
102 rod
104 impact head
106 tip
110 electro-magnetic actuator
116 controller
120 support element
121 bore
122 hydro-elastic joint
124 support element
126 support member
321, 401 connections d distance
k constant
AA right view
C constant
R direction
Z axis
α angle
φ frequency

What is claimed is:

1. A process for testing the quality, in particular the stiffness and the phase, of an elastic joint for connecting two other parts while filtering vibrations transmitted between these two other parts, said elastic joint being meant to work in axial, radial or torsional direction, disposing or not disposing of one or more hydro-elastic chambers and of two cylindrical concentric support elements including an inner support element and an outer support element, the inner support element being located to a large extent inside the volume defined by the outer support element, the two support elements being connected by a set of components made of rubber, elastomer, plastic, or metallic parts, or a combination thereof, wherein said support elements are themselves respectively attached to the two other parts which the elastic joint connects, wherein a technique of testing by impact is applied within the timing of the production line of the elastic joint, for identifying joint quality through a frequential analysis of the oscillation of the impacted area of the elastic joint, wherein the values of the phase shift of the frequential analysis are compared with a bandwidth of permissible phase shift.

2. The process according to claim 1, wherein the values for the phase shift yielded by the frequential analysis are compared in at least one given, limited frequency range, or at least two given, limited frequency ranges, wherein the given, limited frequency range is in particular defined within the range of the total frequency of 0 to 2000 Hz, wherein in particular the given, limited frequency ranges are spaced apart from each other in particular by at least 10 Hz.

3. The process according to claim 2, wherein a limited frequency range is defined around a frequency value of a relative maximum, a relative minimum, or both of the phase shift in particular of a reference curve for the phase shift.

4. The process according to claim 2, a limited frequency range extends from about 100 Hz to about 200 Hz, from about 200 Hz to about 300 Hz, from about 350 Hz to about 450 Hz, or a combination thereof.

5. The process according to claim 2, wherein a limited frequency range is defined around a transition frequency value of 90 or 180 degrees of phase shift of a reference curve.

6. A process for testing the quality, in particular the stiffness and the phase of an elastic joint for connecting two other parts while filtering the vibrations transmitted between these two other parts, said elastic joint being for work in axial, radial or torsional direction, disposing or not disposing of one or more hydro-elastic chambers, and being composed of two cylindrical, concentric support elements including an inner support element and an outer support element, wherein the inner support element is to a large extent located inside the volume defined by the outer support element, the two support elements being connected by a set of rubber, elastomer, plastic, or metallic parts, or a combination thereof said support elements themselves being respectively attached to the two other parts which the elastic joint connects, wherein a technique of testing by impact is applied within the timing of the production line of the elastic joint, for identifying joint quality through a frequential analysis of the oscillation of the impacted area of the elastic joint within in a total frequency range of particularly between 0 and 2000 Hz, wherein the values of the frequential analysis module are compared to a permissible module bandwidth that envelopes a curve of a reference module within a limited frequency range, in particular between about 50 and about 250 Hz, included in the total frequency range and in that the limited frequency range is defined around a frequency of a first resonance peak of the reference curve, wherein the frequency of the first resonance peak has a frequency below a frequency value of a second resonance peak of the reference curve.

7. The process according to claim 6, wherein the limited frequency range extends from about 50 Hz to about 250 Hz.

8. The process according to claim 6, wherein the module values yielded by the frequential analysis of the oscillation of the impacted support element are compared in two limited frequency ranges, the first limited frequency range being defined around the frequency of the first resonance peak of the reference curve and the second limited frequency range being spaced apart from the first limited frequency range, in particular by at least 100 Hz.

9. The process according to claim 8, wherein the second limited frequency range is defined around the frequency of the second resonance peak of the reference curve, being in particular the absolute maximum of the reference module curve, between about 350 and about 450 Hz, the second limited frequency range extends from about 500 Hz to about 800 Hz, or a combination thereof.

10. The process according to claim 1, wherein the frequential analysis of the oscillation of the impacted support element is either totally or partially compared to a permissible bandwidth in a total frequency range of 0 to 2000 Hz in order to gain knowledge of the cause of the possible non-conformity and the frequency at which it occurred.

11. The process according to claim 6, wherein the reference curve for the module or the phase shift in the frequency domain is generated by an impact analysis of an acceptable quality reference elastic joint or by a numeric simulation of an acceptable quality reference elastic joint.

12. The process according to claim 1, wherein the permissible frequency band enveloping the curve of the module or of the phase shift is formed from a curve of maximum module or phase shift values and from a curve of minimum module or phase shift values, the curves of maximum and minimum module or phase shift values having in particular a distance between each other of less than about 15 percent of the maximum value of the module curve of the reference phase shift, in particular of less than about 10 percent, preferably of less than about 5 percent.

13. The process according to claim 1, wherein the impact is realised in less than 15 milliseconds on the outer support element.

14. The process according to claim 1, wherein the impact is realised in less than 15 milliseconds on the inner support element.

15. The process according to claim 13, wherein the duration of the impact and the absence of impact rebound are monitored by a sensor integrated in an impact head, the sensor being in particular a piezo-electric sensor.

16. The process according to claim 1, wherein the impact is produced at a point of the support element located on the theoretical working axis of said support element or the impact is produced at a point of the support element located outside the theoretical working axis of said support element.

17. The process according to claim 1, wherein a force and displacement sensor for recording the oscillations of the impacted support element is located at a point located on the theoretical working axis of the support element.

18. The process according to claim 1, wherein several force or displacement sensors for recording the oscillations of the impacted support element are disposed at locations other than the theoretical working axis of the support element.

19. The process according to claim 18, wherein the frequential analysis of the oscillation of the impacted support element is realised simultaneously for all the displacement sensors in less than 10 seconds.

20. The process according to claim 18, wherein at least one force and displacement sensor for recording the oscillations of the impacted support element is used for pushing onto said support element such that the support element is translationally displaced with respect to the fixed support element or such that the support element is rotationally displaced by an angle ($\alpha$) with respect to the fixed support element.

21. The process according to claim 1, wherein the impact load on the elastic joint is between 180 N and 300 N.

22. An apparatus for testing the quality, in particular the stiffness and the phase, of a hydro-elastic joint for connecting two other parts while filtering vibrations transmitted between these two other parts, said elastic joint being meant to work in axial, radial or torsional direction, disposing or not disposing of one or more hydro-elastic chambers and comprising:
 two cylindrical concentric support elements including an inner support element and an outer support element, the inner support element being located to a large extent inside the volume defined by the outer support element, the two support elements being connected by a set of components made of rubber, elastomer, plastic, or metallic parts, or a combination thereof, wherein said support elements are themselves respectively attached to the two other parts which the elastic joint connects;
 an impact head for exerting an impact onto one of the support elements and a support device for keeping the elastic joint clamped in a fixed position to prevent displacement at the other support element without permanent deformation; and
 a magneto-electric actuator for accelerating the impact head onto the support element.

23. The apparatus according to claim 22, wherein the apparatus is suitable for exerting an impact load onto the elastic joint between 180 N and 300 N.

24. The apparatus according to claim 22, wherein the arrangement comprises a load sensor, in particular in the form of a piezo-electric sensor.

25. The apparatus according to claim 24, wherein the load sensor integrated in the impact head is used, besides for load measurements, for verifying that the duration of the impact remains equal to a set value, which is smaller than 15 milliseconds, for verifying that the impact is singular without rebound, or for both.

26. The apparatus according to claim 22, wherein the apparatus comprises at least one force and displacement sensor for recording the oscillations of the impacted support element, and that the at least one force and displacement sensor is fitted with a magnetic support member of appropriate shape suitable for being attached onto the impacted support element at a specific location to form a sensor-magnetic support member assembly while cooperating with the support element at the specific location for each sensor-magnetic-support-member assembly.

27. The apparatus according to claim 26, wherein the at least one force and displacement sensor for recording the oscillations of the impacted support element is of the laser type.

28. The apparatus according to claim 26, wherein the at least one force and displacement sensor for recording the oscillations of the impacted support element is suitable for pushing beforehand onto the support element to be impacted in order to reversibly position the latter into a position differing from the one the support element occupies in the absence of external loads.

29. The apparatus according to claim 27, wherein the support element to be impacted is translationally or rotationally displaced beforehand by a system independent from the at least one force and displacement sensor.

30. The apparatus according to claim 27, wherein the frequential analysis of the signals coming from the at least one force and displacement sensor for storing the oscillations of the impacted support element are in total or in part compared with a permissible band in the frequency range 0 to 2000 Hz, allowing for the identification of quality of elastic joints.

31. The apparatus according to claim 30, wherein the frequencies at which the output signals coming from the at least one load and displacement sensor depart from the permissible bandwidth in conjunction with the amount of the observed deviation are used to identify the origin of non-conformity of the elastic joint from a reference acceptable quality.

32. The process according to claim 14, wherein the duration of the impact and the absence of impact rebound are monitored by a sensor integrated in an impact head, the sensor being in particular a piezo-electric sensor.

* * * * *